Figure 5:
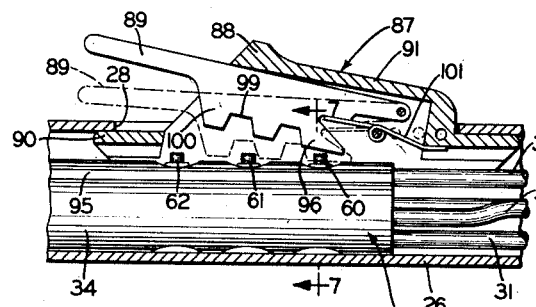

June 16, 1964
J. A. MAURER ETAL
3,137,297
SYRINGE CONSTRUCTION
Filed July 24, 1961
3 Sheets-Sheet 1
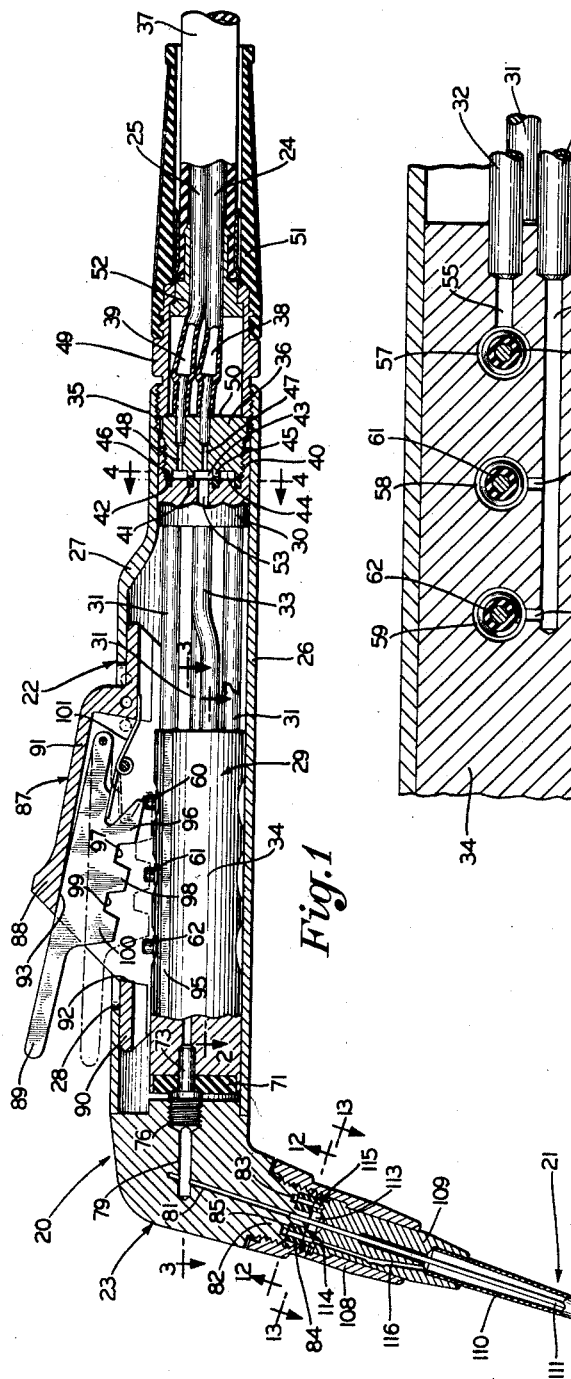
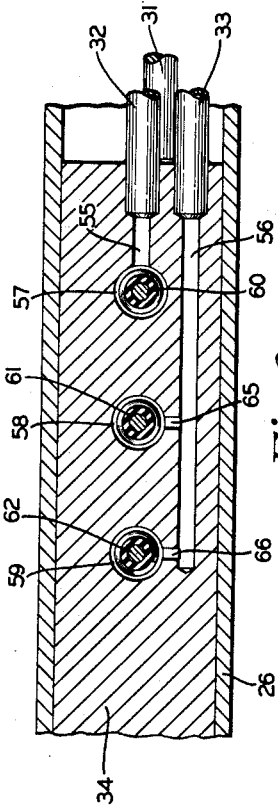
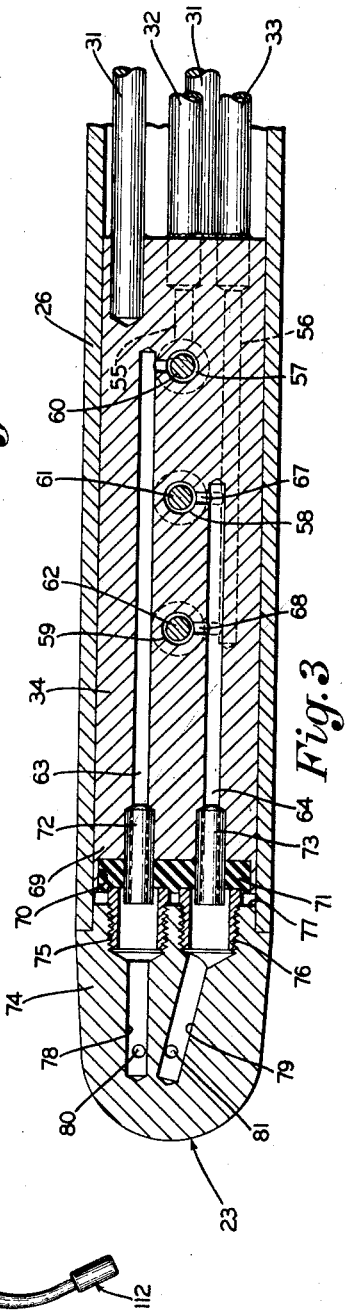
INVENTORS
John A. Maurer and
BY Kenneth R. Lappin
Frease, Bishop, Johns & Schick
ATTORNEYS June 16, 1964   J. A. MAURER ETAL   3,137,297
SYRINGE CONSTRUCTION
Filed July 24, 1961   3 Sheets-Sheet 2

INVENTORS
John A. Maurer
BY Kenneth R. Lappin

Frease, Bishop, Johns & Schick
ATTORNEYS

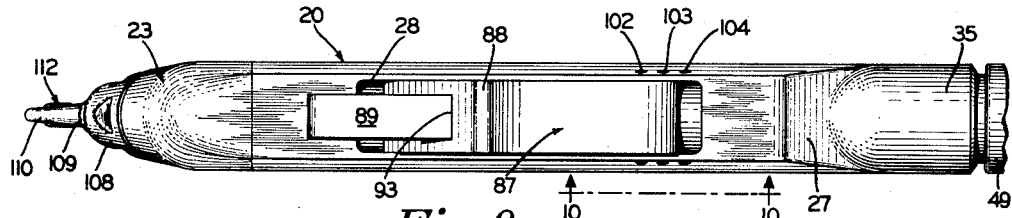
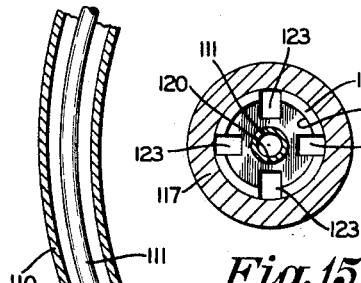
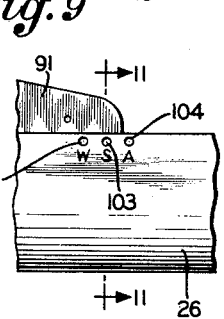
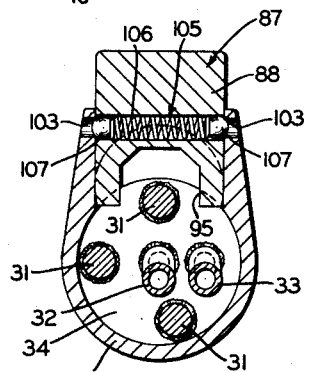
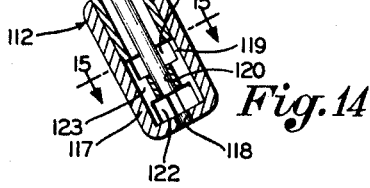
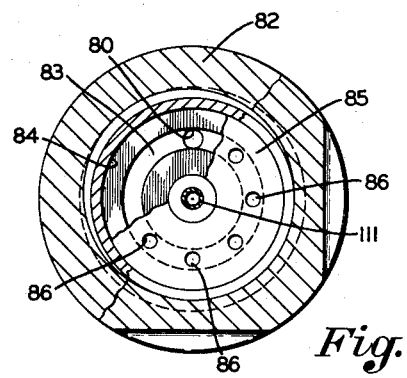
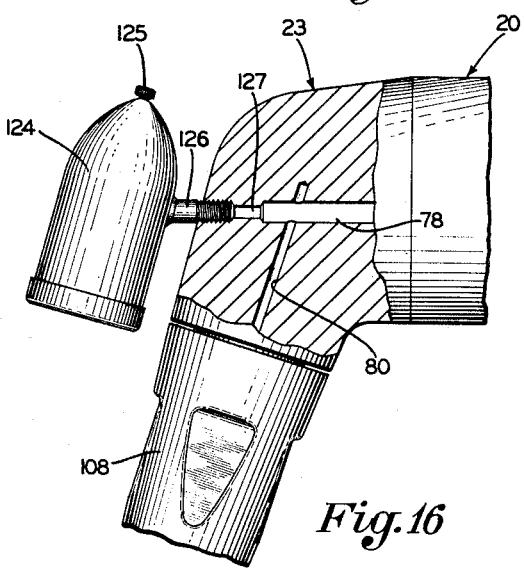
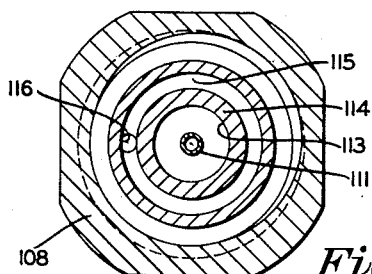

United States Patent Office 3,137,297
Patented June 16, 1964

3,137,297
SYRINGE CONSTRUCTION
John A. Maurer and Kenneth R. Lappin, Canton, Ohio, assignors to The Weber Dental Manufacturing Company, Canton, Ohio, a corporation of Ohio
Filed July 24, 1961, Ser. No. 126,151
16 Claims. (Cl. 128—173.1)

Our invention relates generally to syringe constructions, and more specifically to a syringe construction particularly adapted for dental and other related uses. Even more specifically, our invention relates to a syringe construction which, through selective adjustment and manipulation, may be successively used for ejecting fluids of various types and predetermined mixtures thereof.

Most prior constructions of syringes, usually forming an integral part of dental units and the like, have been of a single purpose type. For instance, in such dental units, it has been common to provide several syringes with one for selectively ejecting a stream of warm water and another for ejecting a stream of air.

One prior known form of syringe construction has been arranged for selectively ejecting air or water or mixtures of the two. The results accomplished with this multi-purpose arrangement of syringe have been found to be highly desirable and convenient, but with this prior construction it has been necessary to provide a complicated expensive and bulky control unit mounted on the dental unit for directing the various fluids to the syringe when and as desired.

A further difficulty with this prior multi-purpose form of construction is that it is necessary to have long flexible tubes between the control unit for the syringe mounted on the dental unit and the syringe itself. This has resulted in the disadvantage that when the control unit is changed for supplying one fluid to another, there are certain delays between this change at the control unit and the ejection from the syringe, since it is first necessary to exhaust the main supply tube to the syringe before this change is apparent in the ejection from the syringe.

A still further disadvantage of this prior multi-purpose construction is that every time a change from one fluid to another is desired, it is necessary for the dentist using the syringe to stop operation of the same, move away from the normal field of operation, that is, the patient's mouth, and make the necessary changes at the control unit of the syringe. This of course, completely distracts the dentist from his work and is a time-consuming and inconvenient operation.

It is, therefore, a general object of the present invention to provide an improved syringe construction which is of the multi-purpose type, yet overcomes the difficulties and inconveniences of the prior constructions discussed above.

It is a primary object of the present invention to provide an improved syringe construction which is of the multi-purpose type, yet does not require the dentist to be distracted from his field of operation during the changing of the syringe from the ejection of one fluid to another.

It is a further object of the present invention to provide an improved syringe construction which has a combined operating and adjustment means directly thereon for selectively operating the syringe to eject fluid therefrom which may be selectively adjusted to various operating positions for ejecting one or the other of desired fluids, or mixtures of the two.

It is still a further object of the present invention to provide an improved syringe construction which may have an improved multiple valve assembly mounted therein in a conveniently removable manner in order that the periodic servicing of the valves may be conveniently accomplished.

It is an additional object of the present invention to provide an improved syringe construction of the multi-purpose type which may have a specific form of mixing chamber therein for properly mixing various fluids prior to ejection of the mixture from the same.

It is still another object of the present invention to provide an improved syringe construction which may have a conveniently attachable medication attachment thereon for providing a predetermined amount of medication automatically into one of the streams of fluid, so that the final stream of fluid ejected therefrom will contain a desired amount of such medication.

Finally, it is an object of the present invention to provide an improved syringe construction which satisfies all of the above objects in a simple, efficient and compact manner, and which may be provided at a minimum of expense.

These and other objects are accomplished by the parts, constructions, arrangements, combinations and subcombinations comprising the present invention, the nature of which is set forth in the following general statement, preferred embodiments of which—illustrative of the best modes in which applicants have contemplated applying the principles—are set forth in the following description and illustrated in the accompanying drawings, and which are particularly and distinctly pointed out and set forth in the appended claims forming a part hereof.

In general terms, the syringe construction comprising the present invention may be stated as including a handle portion and a nozzle portion, with the handle portion being made up of a body and head and with the nozzle portion being operably connected to the head. The body of the handle portion is preferably provided with supply connection means for receiving simultaneously, supplies of two separate fluids, with this supply connection means being operably connected to a valve assembly unit for simultaneously supplying the two separate fluids to the valve assembly unit.

The valve assembly unit is made up of three separate fluid valve means which valve means are selectively movable between normally closed positions obstructing the flow of fluid therethrough and open positions permitting the flow of fluid therethrough, with one of said valve means being operably connected for receiving a first fluid from the supply connection means and the second and third valve means being operably connected for receiving a second fluid from the supply connection means. Further, the body of the handle portion may have operably mounted thereon selectively adjustable and selectively operable valve operating means which is mounted for selective adjustment between three positions and may be operated in any of these three positions to move certain of the valve means between closed and open positions.

In the first position, the operating means is movable for actuation of the first valve means between closed and open positions for the passage of the first fluid through the valve assembly unit. In the second position, the valve operating means is movable for actuating both the first and second valve means for permitting the flow of both the first and second fluid through the valve assembly unit, but through separate flow channels. In the third position, the valve operating means is movable for actuating the third valve means for permitting the flow of only the second fluid through the valve assembly unit.

Still further, the head of the handle portion is operably connected to the body for separately receiving one or both of the first and second fluids dependent on which of the three valve means are being actuated, with this head being operably connected to the nozzle portion for directing the two fluids in separate flow channels in the nozzle portion. The operable connection between the nozzle portion and the head of the handle portion is through a specific form of nozzle inlet connection means which maintains the fluids separate and separately directs these two fluids into separate flow channels in the nozzle portion.

Finally, in the nozzle portion, a specific form of mixing chamber may be provided into which chamber the two fluids are directed and are properly mxed therein. This mixing chamber is preferably formed within the tip of the nozzle, so that immediately after mixture, the two fluids in their mixed state are ejected from the nozzle.

In addition, a medication attachment may be provided for the syringe construction, which medication attachment is preferably operably connected into one of the flow channels of one of the fluids in the head of the handle portion. This medication attachment may be constructed for withdrawal of a selected amount of medication therefrom by a venturi principle, into the stream of the particular fluid, with the medication ultimately being ejected from the tip of the nozzle portion as a part of the particular fluid or as a part of the mixture of two fluids.

Figure 6:
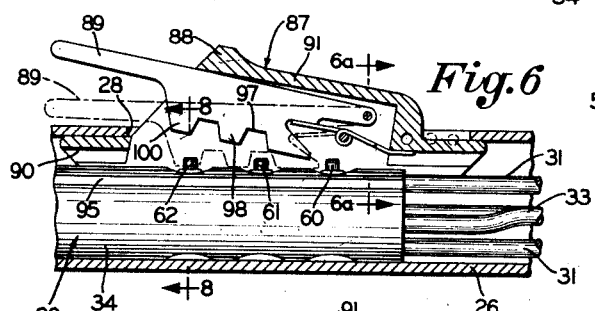
Figure 6A:
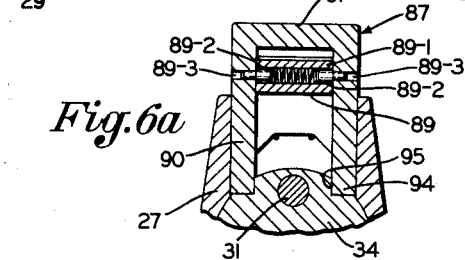
Figure 4:
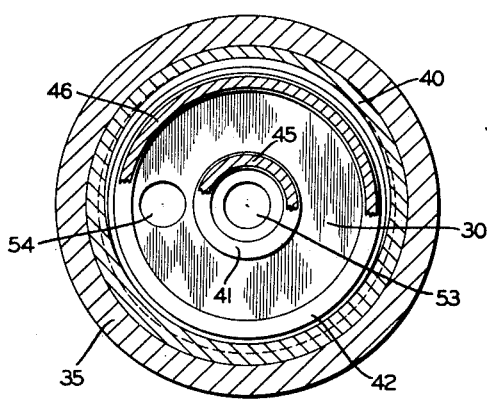
Figure 7:
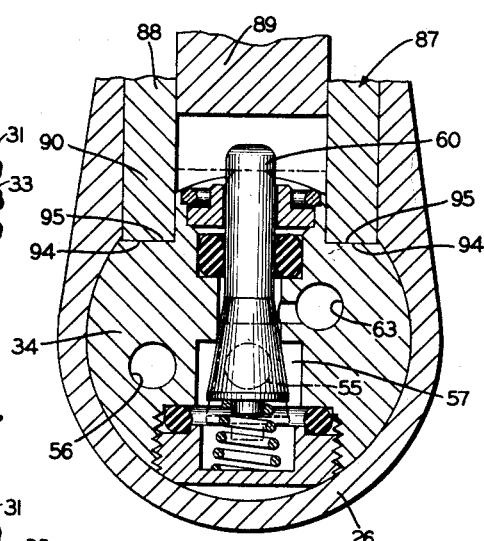
Figure 8:
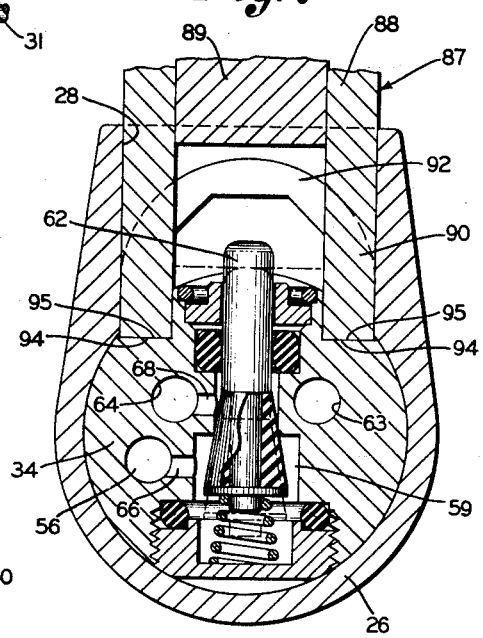

By way of example, embodiments of the improved syringe construction of the present invention are illustrated in the accompanying drawings forming a part hereof, wherein like numerals indicate similar parts throughout the several views, and in which:

FIG. 1 is a vertical sectional view, part in elevation, showing one form of the syringe construction of the present invention;

FIG. 2, an enlarged fragmentary sectional view, part in elevation, looking in the direction of the arrows 2—2 in FIG. 1;

FIG. 3, an enlarged fragmentary sectional view, part in elevation, looking in the direction of the arrows 3—3 in FIG. 1;

FIG. 4, an enlarged sectional view, part in elevation and with parts broken away, looking in the direction of the arrows 4—4 in FIG. 1;

FIG. 5, a fragmentary sectional view taken from FIG. 1 and showing the valve operating means in a different adjusted operating position;

FIG. 6, a view similar to FIG. 5, but showing the valve operating means in still another adjusted operating position;

FIG. 6a, an enlarged fragmentary section on line 6a—6a, FIG. 6;

FIG. 7, an enlarged fragmentary sectional view, part in elevation, looking in the direction of the arrows 7—7 in FIG. 5;

FIG. 8, an enlarged fragmentary sectional view, part in elevation and with parts broken away, looking in the direction of the arrows 8—8 in FIG. 6;

FIG. 9, a top plan view of the syringe construction of FIG. 1;

FIG. 10, a fragmentary side elevation, looking in the direction of the arrows 10—10 in FIG. 9;

FIG. 11, an enlarged sectional view, part in elevation, looking in the direction of the arrows 11—11 in FIG. 10;

FIG. 12, an enlarged sectional view, part in elevation and with parts broken away, looking in the direction of the arrows 12—12 in FIG. 1;

FIG. 13, an enlarged sectional view, part in elevation, looking in the direction of the arrows 13—13 in FIG. 1;

FIG. 14, an enlarged fragmentary vertical sectional view of a part of the nozzle portion of the syringe construction of FIG. 1;

FIG. 15, an enlarged sectional view, part in elevation, looking in the direction of the arrows 15—15 in FIG. 14; and FIG. 16, a fragmentary side elevation, with parts broken away and in section, of a second embodiment of the syringe construction of the present invention.

Referring to FIG. 1, the form of the syringe construction of the present invention illustrated in FIGS. 1 through 15 is made up of a handle portion, generally indicated at 20, and a nozzle portion, generally indicated at 21, with the handle portion being formed by a body, generally indicated at 22, and a head, generally indicated at 23. Two fluids, such as air and water, are supplied to the body 22 of the handle portion 20 through the usual air supply tube 24 and water supply tube 25.

Although in the present description and claims, the improved syringe construction of the present invention is described and claimed for use with air and water, and mixtures thereof, it should be understood that the principles of the present invention may be applied for use with other fluids, whether one is gas and one is liquid, or both are either gas or liquid. The usual fluids involved in dental work are, however, air and water.

The body 22 of the handle portion 20 is formed by a hollow tubular casing 26. Casing 26 is provided with an upward projecting portion 27 having the generally rectangular opening 28.

A valve assembly unit 29 is longitudinally slidably received within the casing 26, with this valve assembly unit being formed by the generally cylindrical fluid inlet connector 30, a series of connecting rods 31, an air connection tube 32, a water connection tube 33, and the generally cylindrical valve block 34. This entire valve assembly unit 29 may be assembled as a unit within the casing 26 through the rearward end 35 of the casing and is retained within the casing 26 in proper position by the attachment of the fluid supply coupling 36, as will be hereinafter more fully described.

As shown in FIG. 1, the air and water supply tubes 24 and 25 extend from the sources of supply of the air and water through the usual covering tube 37, extending from this covering tube and being attached over the air and water nipples 38 and 39 of the fluid supply coupling 36. The coupling 36 is threadably received in the hollow rearwardly projecting connection portion 40 of the fluid inlet connector 30 against the annular concentrically positioned resilient inner washer 41 and resilient outer washer 42.

As shown, the coupling 36 is provided at the inner end thereof with a central circular recess 43 and an outer annular and surrounding recess 44, thereby forming an outer axially projecting metal ring 46 surrounding the outer recess 44 and an inner concentric metal ring 45 lying inwardly of the outer recess 44 and surrounding the central recess 43. As is also shown in FIG. 1, the air and water nipples 38 and 39 extend into the fluid supply coupling 36, with the air nipple 38 being connected through an air channel 47 into the central recess 43, and with the water nipple 39 being connected through a water channel 48 into the outer recess 44.

The resilient inner and outer washers 41 and 42 are positioned axially aligned with the inner and outer rings 45 and 46 of the coupling 36 and these washers 41 and 42 may be positioned partially recessed within the coupling 36, as shown. Thus, the central recess 43 is sealed within the inner washer 41 and inner ring 45, and the outer recess 44 is sealed between this inner washer and inner ring and the outer washer 42 and outer ring 46.

A supply tube holder 49 may also be threadably received within the rearward end 35 of the casing 26 rearwardly of the coupling 36 and bearing against a rear surface 50 of this coupling. This supply tube holder 49 preferably has secured thereon the outer resilient tube guard 51 and encompasses and holds the tube end bushing 52 to which the end of the covering tube 37 is attached and through which the air and water supply tubes 24 and 25 project.

An air channel 53 is formed through the fluid inlet connector 30 axially aligned with the central recess 43 of the fluid supply coupling 36, and a water channel 54 is formed through the fluid inlet connector 30 axially aligned with a portion of the outer recess 44 in the fluid supply coupling 36, as best seen in FIGS. 1 and 4. Air channel 53 connects into the air connection tube 32 and water channel 54 connects into the water connection tube 33, which connection tubes 32 and 33 in turn extend forwardly between the fluid inlet connector 30 and the valve block 34, as shown in FIGS. 1, 2, 3 and 11.

As best seen in FIGS. 2 and 3, the air connector tube 32 within valve block 34 connects into the air inlet channel 55 of this valve block, whereas the water connection tube 33 connects into the water inlet channel 56 therein. Furthermore, the connecting rods 31 extending secured between the fluid inlet connector 30 and the valve block 34 are merely solid rods for the purpose of maintaining the valve assembly unit 29 rigid and relieving stresses from the air and water connection tubes 32 and 33.

Within the valve block 34, the air inlet channel 55 connects axially into a lower portion of a first air valve 57, and the water inlet channel 56 by-passes the first air valve 57 and connects into the lower portions of both of the second water valve 58 and third water valve 59, as can be best seen in FIGS. 2, 3, 7 and 8. All of valves 57, 58 and 59 are of a usual construction, resiliently urged to a normally closed position, blocking the passage of fluid therethrough, and selectively movable to an open position for permitting the passage of fluid therethrough. Furthermore, the valves 57, 58 and 59 are provided with the plungers 60, 61 and 62, respectively, which are resiliently urged to upward normal positions closing the valves and may be moved selectively downwardly to lower positions opening the valves. As shown in FIGS. 7 and 8, these plungers 60, 61 and 62 project upwardly from the valve block 34 for manipulation between open and closed positions by means outward of and above the valve block, as will be hereinafter described.

As best seen in FIGS. 3, 7 and 8, an air outlet channel 63 is formed within the valve block 34 connected into an upper portion of the first air valve 57 and extending forwardly through the remainder of this valve block, by-passing the second and third water valves 58 and 59. A water outlet channel 64 is similarly formed in the valve block 34 connected into upper portions of both of the second and third water valves 58 and 59, also extending forwardly through the remainder of the valve block.

Thus, with the construction of the valve block 34 shown and described, air may enter the valve block to the first air valve 57 through the air inlet channel 55, and will pass through the first air valve when the plunger 60 thereof is depressed, into the air outlet channel 63, and ultimately forwardly through the remainder of the valve block. Also, water entering the valve block through the water inlet channel 56 will pass through either of the second and third water valves 58 and 59, when either of the respective plungers 61 and 62 thereof is depressed, with this water passing forwardly through the remainder of the valve block through the water outlet channel 64. In the event any of the plungers 60, 61 or 62 are in the normal upward positions, the air or water will be blocked from passing that particular valve, so that the flow of this air or water forwardly through the valve block will be prevented.

As can be best seen in FIGS. 2 and 3, the water inlet channel 56 is connected for communication into the second and third water valves 58 and 59 by the ports 65 and 66, respectively, and the water outlet channel 64 is connected into the second and third water valves 58 and 59 through the ports 67 and 68, respectively. By providing these ports to the particular valves of predetermined size, the flow of water through the particular valve may be limited to a desired quantity of flow. According to the present invention, it is preferred that the ports 65 and 67 for the second water valve 58 are of a predetermined size smaller than the ports 66 and 68 to the third water valve 59, to thereby provide less water flow through the second water valve 58 when in open position than through the third water valve 59 when in open position, for a purpose to be hereinafter more fully described.

The forward end 69 of the casing 26 is telescoped secured over a portion of the head 23, and at this forward end of the casing, the valve block 34 is formed with a cylindrical recess 70 receiving the cylindrical resilient washer 71. The air and water nipples 72 and 73 are received in the forward end of the valve block 34 through the washer 71 and in communication with the forward ends of the air and water outlet channels 63 and 64, respectively, with these nipples 72 and 73 projecting forwardly from the valve block 34 and washer 71.

Aligned with the air and water nipples 72 and 73 of the valve block 34, the rearward end 74 of the head 23 threadably receives the air and water nipple sockets 75 and 76, which sockets project rearwardly from the rearward face 77 of the head 23 a predetermined distance. Furthermore, the air and water nipple sockets 75 and 76 communicate forwardly with the air and water forward channels 78 and 79 formed forwardly partially through the head 23, as best seen in FIGS. 1 and 3.

The air and water downward channels 80 and 81 are formed in the head 23 from and in communication with the air and water forward channels 78 and 79, respectively, with the water downward channel 81 opening centrally through the lower end 82 of head 23 and the air downward channel 80 opening into an annular recess 83 at the head lower end. Recess 83 is formed at the upper termination of a larger annular recess 84, with this larger recess opening downwardly of the head 23, and both recesses surrounding the central portion of the lower end 82 through which the water downward channel 81 opens.

An annular resilient washer 85 is received within the larger recess 84 at the head lower end 82 and this washer 85 is provided with a series of openings 86 therethrough, axially aligned with the smaller overlying recess 83, as best seen in FIGS. 1 and 12. Thus, the water downward channel 81 opens through the head lower end 82 centrally thereof and radially within the washer 85, while the air downward channel 80 opens into the smaller recess 83 at this head lower end and communicates from the smaller recess 83 through the series of openings 86 in washer 85.

As hereinbefore described, the valve assembly unit 29 is slidably received as a complete unit within the body casing 26, with the fluid supply coupling 36 threadably received secured to the fluid inlet connector 30 and thereby sealing against the inner and outer washers 41 and 42 between supply coupling 36 and inlet connector 30. Thus, with the valve assembly unit 29 slid into the body casing 26, when the supply tube holder 49 is threaded into the casing rearward end 35, this tube holder 49 will bear against the coupling 36, as shown in FIG. 1, and will cause the air and water nipples 72 and 73 at the forward ends of the air and water outlet channels 63 and 64 to be received within the air and water nipple sockets 75 and 76, with the washer 71 sealing against these sockets 75 and 76 and providing the necessary air and water seals around the various channels of communication for the air and water between the body 22 and head 23.

Furthermore, with the valve assembly unit 29 thusly positioned, the valve block 34 is properly positioned relative to a valve actuating or operating assembly 87, as shown in FIGS. 1, 5 through 8, and 9 through 11. As shown, the valve actuating assembly 87 is received through opening 28 formed through the projecting portion 27 of the casing 26, and includes a slidable lever mounting member 88 and a pivotal actuating or operating lever 89.

The lever mounting member 88 is formed of downwardly opening generally U-shaped cross section configuration and is comprised of the lower forwardly and rearwardly projecting engagement flange 90 and the upwardly projecting lever housing 91, with flange 90 being received slidably within the casing 26 and projecting forwardly and rearwardly of the casing opening 28, and with the housing 91 projecting upwardly from flange 90 through the casing opening 28. Furthermore, the flange 90 is formed with a forwardly and rearwardly projecting slot 92 formed therethrough, opening into the housing 91, and the housing 91 is provided with the forward lever opening 93 opening forwardly above the casing 26.

The forward and rearward extent of the lever housing 91 is a predetermined amount less than the forward and rearward extent of the casing opening 28, so that the entire valve actuating assembly 87 is slidable forwardly and rearwardly relative to the casing 26. Also, the spaced lower edges 94 of the engagement flange 90 slidably engage in forwardly and rearwardly projecting engagement grooves 95 formed in the valve block 34, as best seen in FIGS. 7 and 8, so that the valve actuating assembly 87 is guided for its forward and rearward slidable movement by and engaged between the casing 26 and valve block 34.

The actuating or operating lever 89 is pivotally mounted at its rear end 89–1 (FIG. 6a) on spring pressed pins 89–2 engaged in openings 89–3 in the lever housing 91 of the lever mounting member 88; and lever 89 projects forwardly through the lever opening 93 of housing 91. The plungers 60, 61 and 62 of the first, second and third valves 57, 58 and 59 are aligned underlying the slot 92 in the engagement flange 90 and these plungers are always exposed through this slot to the actuating lever 89 despite the slidable positioning of the lever mounting member 88.

The lower edge of the actuating lever 89 is formed successively, beginning at the rearward end thereof, with a first valve engagement projection 96, a first downwardly opening recess 97, a second valve engagement projection 98, a second downwardly opening recess 99, and a third valve engagement projection 100, so that three spaced downward projections 96, 98 and 100 are provided spaced by the recesses 97 and 99. Further, the actuating lever 89 is normally urged to an upward pivotal position by the spring 101, but when this lever 89 is moved to a downward pivoted position, the lower edge thereof, with the projections and recesses, extends downwardly through the slot 92 in the engagement flange 90, so that the projections 96, 98 and 100 are engageable against the valve plungers 60, 61 and 62 of the valve block 34 with the particular engagement being dependent on the particular slidable positioning of the lever mounting member 88, as will be hereinafter described.

As shown in FIGS. 1, 5, 6 and 9 through 11, a series of three sets of positioning openings are formed through the upwardly projecting portion 27 of the casing 26, with the forwardmost set of openings being the water positioning openings 102, the middle set of openings being the spray or mixed water and air positioning openings 103, and the rearward set of openings being the air positioning openings 104. As shown in FIG. 11, inward of the positioning openings 102, 103 and 104, a spring engagement member 105 is formed within the lever mounting member 88, positioned for spring engagement in any of the sets of positioning openings as determined by the particular positioning of the lever mounting member 88 relative to the casing 26.

This spring engagement member 105 is formed by the spring 106 and opposed engagement balls 107, which balls are resiliently urged into engagement with sets of positioning openings when this spring engagement member 105 is aligned therewith. Thus, the forward and rearward slidable movement of the lever mounting member 88 is provided with three set or predetermined positions by virtue of the spring engagement member 105 engaging with the various sets of positioning openings 102, 103 and 104.

As shown in FIG. 5, when the lever mounting member 88 is slid rearwardly to its rearmost position, with the spring engagement member 105 engaged in the air positioning openings 104, depression of the actuating lever 89 to the broken line position shown in FIG. 5 will cause the first valve engagement projection 96 to engage and depress the plunger 60 of the first air valve 57, thereby opening this valve. At the same time, the plunger 61 of the second water valve 58 will be received in the second recess 99 and the plungers 62 of the third water valve 59 will be positioned forwardly of lever 89, so that the second and third water valves 58 and 59 remain closed.

Referring to FIG. 1, when the lever mounting member 88 is slid forwardly to its intermediate position with the spring engagement member 105 engaged in the spray positioning openings 103, and the lever 89 is depressed to the broken line position shown in FIG. 1, the plunger 60 of the first air valve 57 will still be engaged and depressed by the first valve engagement projection 96, while the plunger 61 of the second water valve 58 will also be engaged and depressed by the second valve engagement projection 98. At this time, the plunger 62 of the third water valve 59 is still forwardly of any part of lever 89, so that this third water valve remains closed.

Referring to FIG. 6, when the lever mounting member 88 is slid forwardly to its forwardmost position with the spring engagement member 105 engaged in the water positioning openings 102, and the lever 89 is depressed to its broken line position shown in FIG. 6, the plunger 62 of the third water valve 59 is engaged and depressed by the third valve engagement projection 100, thereby opening this third water valve 59. At this time, the plunger 61 of the second water valve 58 is received in the first recess 97 and the plunger 61 of the first air valve 57 is positioned rearwardly of any effective portion of lever 89, so that the first air valve 57 and second water valve 58 remain closed.

Thus, with the lever mounting member 88 in its rearmost position, the lever 89 may be depressed to cause a flow solely of air through the valve assembly unit 29. In the intermediate position of the lever mounting member 88, the flow is a flow of air, as well as a flow of a predetermined amount of water. In the forwardmost position of the lever mounting member the flow is solely water.

The nozzle portion 21 includes the engagement collar 108, the inlet member 109, the outer air tube 110, the inner water tube 111 and tip assembly 112.

The upper end of the inlet member 109 is formed with a central recess 113 providing a surrounding annular portion 114, within which is formed an annular recess 115, also surrounding the central recess 113, as best seen in FIG. 13. The engagement collar 108 telescopes over the inlet member 109, being engaged with this inlet member and being threadably received secured over the lower end 82 of the handle portion head 23, thereby drawing the inlet member 109 upwardly against head 23.

The central recess 113 of the inlet member 109 is of sufficient size so that the annular portion 114 thereof engages merely the washer 85 at the head lower end 82 outward of the water downward channel 81. Furthermore, the recess 115 within the annular portion 114 is aligned and in communication with openings 86 through the washer 85 previously described, and therefore is in communication with the annular recess 83 in the head lower end 82.

The outer air tube 110 is received secured within the lower end of the inlet member 109 and extends downwardly therefrom, with the inner water tube 111 being telescoped within the outer air tube 110, preferably spaced at all sides therefrom and extending upwardly through the inlet member 109, centrally through the recess 113 of inlet member 109 and into the lower end of the water downward channel 81 at the head lower end 82. An air channel 116 is formed downwardly through the inlet member 109 in communication with the recess 115 at the upper end of inlet member 109, and in communication with the interior of the outer air tube 110 outward of the water tube 111 at the lower end of inlet member 109, as shown in FIGS. 1 and 13.

Referring to FIGS. 14 and 15, the nozzle tip assembly 112 is formed by the tip member 117 having the central outlet opening 118 and enclosing the spacing member 119. The spacing member 119 is formed with a central opening 120 therethrough between an upwardly opening air receiving chamber 121 and a downwardly opening mixing chamber 122, with a series of spaced slots being formed between the air receiving chamber 121 and the mixing chamber 122 outward of and at spaced points completely around the central opening 120.

The tip member 117 is received secured over the lower end of the outer air tube 110 surrounding and enclosing the spacing member 119, and retaining this spacing member upwardly against the lower end of the air tube 110. The inner water tube 111 extends downwardly through the outer air tube 110 and into the central opening 120 of the spacing member 119 and thereby opens into the mixing chamber 122 in alignment with, but spaced upwardly from, the outlet opening 118 of tip member 117.

Thus, the outer air tube 110 communicates into the air receiving chamber 121 around the inner water tube 111, through the spaced slots 123 outward of and at all sides of the inner water tube 111, and into all sides of the perimeter of the mixing chamber 122. The inner water tube 111 communicates centrally into the mixing chamber 122 in alignment with and spaced from the outlet opening 118 of the tip member 117.

In operation of the first embodiment syringe construction of the present invention, when it is desired to eject air alone, the lever mounting member 88 of the valve actuating assembly 87 is slid rearwardly to its rearmost position, as shown in FIG. 5, with the spring engagement member 105 engaged in the air positioning openings 104 of the casing 26. The actuating lever 89 is then depressed to the broken line position shown in FIG. 5, engaging plunger 60 of the first air valve 57 and opening this valve, while the second and third water valves 58 and 59 remain disengaged and therefore closed, as previously described.

The air enters through the air supply tube 24, passing through the air nipple 38 into the air channel 47 of the fluid supply coupling 36, through the central recess 43 and into the air channel 53 in the fluid inlet connector 30. The communication between the central recess 43 and the air channel 53 is sealed outwardly by the inner resilient washer 41 between connector 30 and coupling 36, so that this air cannot leak outwardly into the outer recess 44 in coupling 36.

The air then passes through the air channel 53 into the air connection tube 32 and ultimately into air inlet channel 55 of the valve block 34. From the air inlet channel 55, the air passes centrally into the lower portion of the first air valve 57 and, since the plunger 60 thereof is depressed, the air passes upwardly into the upper portion of this first air valve and then into the air outlet channel 63.

After passing through the air outlet channel 63, bypassing both of the second and third water valves 58 and 59, the air passes into the air nipple 72, through the air nipple socket 75, and into the air forward channel 78 within the head 23. The air then passes downwardly through the air downward channel 80 into recess 83 at the head lower end 82, through the openings 86 in washer 85, and into the recess 115 at the upper end of the nozzle portion inlet member 109.

From recess 115, the air passes downwardly through the air channel 116 in the inlet member 109 into the confines of the outer air tube 110 around the inner water tube 111 and travels the length of this outer air tube 110 to the tip assembly 112. At this tip assembly 112, or the lower end of the outer air tube 110, the air passes into the air receiving chamber 121, through the slots 123 at all sides of the inner water tube 111, and into the mixing chamber 122. Finally, the air is ejected outwardly from the mixing chamber 122 through the central outlet opening 118 of the tip member 117.

In the event that a mixed spray of air and water is desired, lever mounting member 88 of the valve actuating assembly 87 is moved to its intermediate position, as shown in FIG. 1, so that when the actuating lever 89 is depressed to the broken line position shown in FIG. 1, both the plunger 60 of the first air valve 57 and the plunger 61 of the second water valve 58 will be depressed, thereby opening both of these valves, while the plunger 62 of the third water valve 59 remains disengaged and this third water valve remains closed. In this case, the air flow is the same as described above, whereas the water enters through the water supply tube 25 into the water nipple 39 and into the water channel 48 of the fluid supply coupling 36.

From channel 48 of coupling 36, the water enters the annular outer recess 44 and passes into the water channel 54 of the fluid inlet connector 30. The annular outer recess 44 of coupling 36 and the rearward end of the water channel 54 of the connector 30 are sealed outwardly by the outer washer 42, and are sealed inwardly by the inner washer 41 between this connector 30 and coupling 36.

The water then passes through the water channel 54 of connector 30 into the water connection tube 33 and through this water connection tube into the water inlet channel 56 in the valve block 34. From water inlet channel 56, the water passes through the second water valve 58, since this water valve is open, but is prevented from passing through the third water valve 59, since this water valve is closed. As hereinbefore stated, the ports 65 and 67 entering and leaving the second water valve 58 are of a predetermined size metering a particular volume of water flow through the second water valve 58 for providing the ultimate air-water mixture desired.

After passing through the second water valve 58 and outwardly through port 67, the water passes through the water outlet channel 64, through water nipple 73, through the water nipple socket 76, and into the water forward channel 79 of head 23. From channel 79, the water passes downwardly through the water downward channel 81 and into the upper end of the inner water tube 111 of the nozzle portion 21.

The water then passes downwardly through the nozzle portion 21 within the inner water tube 111, centrally through spacing member 119 at the tip assembly 112, and centrally into the mixing chamber 122. As the water enters this mixing chamber 122, the air at the same time is entering the mixing chamber at all sides of the inner water tube 111 through the spaced slots 123 of spacing member 119, so that the stream of water is completely surrounded by the stream of air within the mixing chamber 122 and a thorough desired mixture thereof is ejected from the tip assembly 112 through the outlet opening 118.

When only a stream of water is desired to be ejected from the syringe construction, the lever mounting member 88 of the valve actuating assembly 87 is moved to its forwardmost position, as shown in FIG. 6, and when the actuating lever 89 is moved to its depressed position, as shown in broken lines in FIG. 6, only the plunger 62 of the third water valve 59 is engaged, so that only this third water valve is opened, while the first air valve 57 and second water valve 58 remain closed. In this case, the flow of air is prevented by the first air valve 57 and the flow of water is similar to that described above, with the exception that the flow is through the third water valve 59, rather than the second water valve 58.

Thus, the water entering through the water inlet channel 56 in valve block 34 is blocked at the second water valve 58, but passes forwardly through water inlet channel 56, through the third water valve 59, and into the water outlet channel 64. Also, as the water ultimately flows from the lower end of the inner water tube 111 of the nozzle portion 21, this water passes directly through the mixing chamber 122 and out of the outlet opening 118 of the tip member 117.

Thus, according to the present invention, a syringe construction is provided which is easily and quickly adjusted for ejecting air alone, an air-water mixture or spray, or water alone, without the dentist or the person operating the same being required to divert attention from the particular field of operation, since the adjustment for obtaining the particular flow is accomplished easily and quickly directly on the syringe and with the same hand used to operate the syringe.

Furthermore, with the particular couplings used in the syringe construction between the fluid inlet connector 30 and the fluid supply coupling 36 of the handle portion 20, as well as between the head 23 of the handle portion 20 and the nozzle portion 21, the proper positioning of the various members being joined or coupled is clearly simplified. In both cases, one fluid is directed centrally through the coupling location, whereas the other fluid is directed into a surrounding annular recess which is sealed both inwardly and outwardly by resilient washer means. The outlet for this other fluid of the particular coupling is merely provided at one location in communication with this channel, so that, despite the rotative relationship between the two parts of the coupling, there will always be proper flow therethrough for the two fluids and while the two fluids are maintained positively separated.

Still further, in view of the particular construction of the valve assembly unit 29 as a single and complete unit, it is a simple matter to remove this entire unit for periodic servicing of the valves therein. As previously described, this entire unit may merely be slid rearwardly out through the rearward end of the handle portion 20 and may be reassembled therein in the same simple manner.

Finally, with the unique construction of the tip assembly 112 on the nozzle portion 21 having the mixing chamber 122 for proper mixing of the air and water simultaneously entering this chamber, a complete desired mixture is obtained. As described above, the air enters this mixing chamber at all sides around the stream of water, so that complete mixing takes place prior to the mixture passing outwardly through the tip outlet opening 118.

The second embodiment of the syringe construction of the present invention is shown in FIG. 16 and merely includes the addition of a medication attachment 124 to the remainder of the construction described in the foregoing. This medication attachment includes a control lever 125 and an inlet supply tube 126, which inlet supply tube is connected threadably into the head 23 of handle portion 20 is communication with an inlet channel 127, which in turn communicates with either of the air forward channel 78 or water forward channel 79.

This medication attachment 124, when the control lever 125 is opened, operates according to the usual venturi principle, whereby the flow of fluid through one of the air and water forward channels 78 and 79 and downwardly through one of the air and water downward channels 80 and 81 causes a low pressure to be created within the inlet supply tube 126 and inlet channel 127, thereby drawing a predetermined amount of a desired medication from the medication attachment 124, which medication mixes with the air or water stream. Thus, depending on the particular connection of the medication attachment 124, that is, into the air or water flow streams, the medication can be provided in the particular water or air ejected from the tip assembly 112.

In the foregoing description, certain terms have been used for brevity, clearness and understanding but no unnecessary limitations are to be implied therefrom, because such words are used for descriptive purposes herein and are intended to be broadly construed.

Moreover, the embodiments of the improved construction illustrated and described herein are by way of example and the scope of the present invention is not limited to the exact details of construction shown.

Having now described the invention, the construction, operation and use of preferred embodiments thereof, and the advantageous new and useful results obtained thereby, the new and useful construction and reasonable mechanical equivalents thereof obvious to those skilled in the art are set forth in the appended claims.

We claim:

1. Syringe construction including a body, a nozzle operably connected to the body for receiving fluid from the body therethrough, first and second and third fluid valve means in the body each being selectively movable between a normally closed position blocking the flow of fluid therethrough and an open position permitting the flow of fluid therethrough, air inlet means operably connected through the body to the first valve means for supplying air to the first valve means, water inlet means operably connected through the body to the second and third valve means for supplying water to the second and third valve means, fluid outlet means operably connected to the first and second and third valve means and to the nozzle for receiving fluid from said valve means and transmitting said fluid to said nozzle, and selectively operable valve actuating means operably connected to the body selectively movable to first and second and third adjusted positions for moving the first valve means to open position upon operation in said first adjusted position and simultaneously moving the first and second valve means to open position upon operation in said second adjusted position and moving the third valve means to open adjusted position upon operation in said third adjusted position.

2. Syringe construction as defined in claim 1 in which each of the first and second and third valve means has a plunger movable between a normal outward position in which the particular valve means is in closed position and an inward position in which the particular valve means is in open position; in which the valve actuating means engages the first valve means plunger when operated in first adjusted position moving said first valve means plunger from outward to inward position; in which the valve actuating means engages the first and second valve means plungers when operated in second adjusted position simultaneously moving the first and second valve means plungers from outward to inward position; and in which the valve actuating means engages the third valve means plunger when operated in third adjusted position moving the third valve means plunger from outward to inward position.

3. Syringe construction as defined in claim 1 in which each of the first and second and third valve means has a plunger movable between a normal outward position in which the particular valve means is in closed position and an inward position in which the particular valve means is in open position; in which the valve actuating means is selectively slidably movable between the first and second and third adjusted positions; in which the valve actuating means has spaced projections formed thereon; in which certain of the valve actuating means projections engage the first valve means plunger when said actuating means is operated in first adjusted position moving said first valve means plunger from outward to inward position; in which certain of the valve actuating means projections engage the first and second valve means plungers when said actuating means is operated in second adjusted position simultaneously moving the first and second valve means plungers from outward to inward position; and in which certain of the valve actuating means projections engage the third valve means plunger when said actuating means is operated in third adjusted position moving the third valve means plunger from outward to inward position.

4. Syringe construction as defined in claim 1 in which each of the first and second and third valve means has an upwardly projecting plunger movable between a normal upward position in which the particular valve means is in closed position and a downward position in which the particular valve means is in open position; in which the valve actuating means is selectively slidably mounted overlying the valve means plungers slidably movable to a first rearward position and a second intermediate position and a third forward position; in which the valve actuating means is pivotally mounted for selective pivotal operation thereof; in which the valve actuating means has first and second and third spaced downwardly extending projections formed on a lower surface thereof separated by first and second downwardly opening recesses; in which the actuating means first projection engages the first valve means plunger when said actuating means is operated in first adjusted position moving said first valve means plunger from upward to downward position while the second valve means plunger is received in the actuating means second recess and the third valve means plunger is received forwardly of the third actuating means projection; in which the first actuating means projection engages the first valve means plunger and the second actuating means projection engages the second valve means plunger when said actuating means is operated in second adjusted position simultaneously moving the first and second valve means plungers from upward to downward position while the third valve means plunger is received forwardly of the third actuating means projection; and in which the third actuating means projection engages the third valve means plunger when said actuating means is operated in third adjusted position moving the third valve means plunger from upward to downward position while the first valve means plunger is received rearwardly of the first actuating means projection and the second valve means plunger is received in the first actuating means recess.

5. Syringe construction as defined in claim 1 in which the fluid outlet means includes separate air outlet means and water outlet means; in which the air outlet means is operably connected to the first valve means and to the nozzle for receiving air from said first valve means and transmitting said air to said nozzle; and in which the water outlet means is operably connected to the second and third valve means and to the nozzle for receiving water from said second and third valve means and transmitting said water to said nozzle.

6. Syringe construction as defined in claim 1 in which the fluid outlet means includes separate air outlet means and water outlet means; in which the air outlet means is operably connected to the first valve means and to the nozzle for receiving air from said first valve means and transmitting said air to said nozzle; in which the water outlet means is operably connected to the second and third valve means and to the nozzle for receiving water from said second and third valve means and transmitting said water to said nozzle; and in which the air outlet means and water outlet means are joined into a single outlet means in one of the body and nozzle and prior to the outlet means passing completely through the nozzle.

7. Syringe construction as defined in claim 1 in which the fluid outlet means includes separate air outlet means and water outlet means; in which the air outlet means is operably connected to the first valve means and to the nozzle for receiving air from said first valve means and transmitting said air to said nozzle; and in which the water outlet means is operably connected to the second and third valve means and to the nozzle for receiving water from said second and third valve means and transmitting said water to said nozzle; in which the water inlet means is connected to the second valve means through an inlet port; in which the water inlet means is connected to the third valve means through an inlet port; in which the water outlet means is connected to the second valve means through an oulet port; in which the water outlet means is connected to the third valve means through an outlet port; and in which at least one of the second valve means ports is of less opening size than either of the third valve means ports.

8. Syringe construction including a tubular body having a forward portion and an open rearward end, a head operably connected to the body forward portion for receiving fluid from the body therethrough, a nozzle operably connected to the head for receiving fluid from the head therethrough, a valve block slidably received in the body through the body rearward end, first and second and third fluid valve means in the valve block each being selectively movable between a normally closed position blocking the flow of fluid therethrough and an open position permitting the flow of fluid therethrough, air inlet means operably connected through the body and valve block to the first valve means for supplying air to the first valve means, water inlet means operably connected through the body and valve block to the second and third valve means for supplying water to the second and third valve means, fluid outlet means operably connected through the valve block to the first and second and third valve means and to the head for receiving fluid from said valve means and transmitting said fluid to said head, selectively operable valve actuating means operably connected to the body selectively movable to first and second and third adjusted positions for moving the first valve means to open position upon operation in said first position and simultaneously moving the first and second valve means to open position upon operation in said second position and moving the third valve means to open position upon operation in said third position, and clamping means received in the body rearward end in operable abutment with the valve block clamping the valve block against the head at the body forward portion and retaining the valve block assembled in the body.

9. Syringe construction as defined in claim 8 in which the fluid outlet means includes separate air outlet means and water outlet means; in which the air outlet means is operably connected to the first valve means and to the head for receiving air from said first valve means and transmitting said air to said head; in which the water outlet means is operably connected to the second and third valve means and to the head for receiving water from said second and third valve means and transmitting said water to said head; in which the air and water outlet means are separated from said head when the valve block is slid rearwardly within the body from an assembled position; in which resilient sealing means is positioned between the valve block and head around the air and water outlet means when the valve block is in the assembled position; and in which the clamping means forces the valve block against the sealing means when the valve block is in the assembled position sealing between the valve block and head and around the air and water outlet means.

10. Syringe construction including a body, a nozzle operably connected to the body for receiving fluid from the body therethrough, first and second and third fluid valve means in the body each being selectively movable between a normally closed position blocking the flow of fluid therethrough and an open position permitting the flow of fluid therethrough, air inlet means operably connected through the body to the first valve means for supplying air to the first valve means, water inlet means operably connected through the body to the second and third valve means for supplying water to the second and third valve means, air outlet means operably connected to the first valve means for receiving air from the first valve means and transmitting said air to the nozzle, water outlet means operably connected to the second and third valve means for receiving water from the second and third valve means and transmitting said water to the nozzle, selectively operable valve actuating means operably connected to the body selectively movable to first and second and third adjusted positions for moving the first valve means to open position upon operation in said first position and simultaneously moving the first and second valve means to open position upon operation in said second position and moving the third valve means to open position upon operation in said third position, air channel means formed in the nozzle and operably connected to the valve air outlet means for receiving air from said air outlet means and channeling said air to a lower portion of the nozzle, water channel means formed in the nozzle and operably connected to the valve water outlet means for receiving water from said water outlet means and channeling said water to said nozzle lower portion, a mixing chamber formed in the nozzle lower portion in communication with both of the air and water channel means simultaneously receiving and mixing air and water from said air and water channel means when air and water are flowing in said channel means, and nozzle outlet means communicating outwardly from the mixing chamber for ejecting air and water received in said mixing chamber outward of the nozzle.

11. Syringe construction as defined in claim 10 in which one of the air and water channel means is operably connected communicating with the mixing chamber at all sides of said mixing chamber; and in which the other of the air and water channel means is operably connected communicating with the mixing chamber centrally of said mixing chamber and centrally of the operable connection of the said one of the air and water channel means.

12. Syringe construction as defined in claim 10 in which the air channel means is operably connected communicating with the mixing chamber at all sides of said mixing chamber; and in which the water channel means is operably connected communicating with the mixing chamber and centrally of the operable connection of the air channel means.

13. Syringe construction as defined in claim 10 in which the nozzle is formed with an outer air tube terminating at the nozzle lower portion and an inner water tube telescoped within said outer air tube and terminating at said nozzle lower portion; in which the air channel means is formed between the outer air tube and inner water tube; in which the water channel means is formed within the inner water tube; in which the outer air tube is connected to the mixing chamber around and at all sides of the inner water tube; and in which the inner water tube is connected with the mixing chamber centrally of said mixing chamber and centrally of the outer air tube.

14. Syringe construction as defined in claim 10 in which the nozzle is formed with an outer air tube terminating at the nozzle lower portion and an inner water tube telescoped within said outer air tube and terminating at said nozzle lower portion; in which the air channel means is formed between the outer air tube and inner water tube; in which the water channel means is formed within the inner water tube; in which a spacing member is positioned encompassing an end portion of the inner water tube at the nozzle lower portion retaining the inner water tube centrally of the outer air tube; in which the spacing member has slots formed therethrough at spaced intervals around the inner water tube communicating with the outer air tube and the mixing chamber at all sides of the inner water tube; and in which the mixing chamber is formed at the lower end of the inner water tube.

15. Syringe construction including a tubular body having a forward portion, a head operably connected to the body forward portion for receiving fluid from the body therethrough, a nozzle operably connected to the head for receiving fluid from the head therethrough, first and second and third fluid valve means mounted in the body each being selectively movable between a normally closed position blocking the flow of fluid therethrough and an open position permitting the flow of fluid therethrough, air inlet means operably connected through the body to the first valve means for supplying air to the first valve means, water inlet means operably connected through the body to the second and third valve means for supplying water to the second and third valve means, fluid outlet means operably connected through the body to the first and second and third valve means and to the head for receiving fluid from said valve means and transmitting said fluid to said head, selectively operable valve actuating means operably connected to the body selectively movable to first and second and third adjusted positions for moving the first valve means to open position upon operation in said first adjusted position and simultaneously moving the first and second valve means to open position upon operation in said second adjusted position and moving the third valve means to open position upon operation in said third adjusted position, fluid channel means in the head operably connected between the valve fluid outlet means and nozzle for transmitting fluid through the head, medication attachment means containing a medicament therein, and venturi tube means operably connected into the medication attachment means and into the head fluid channel means for supplying by venturi action a measured amount of medicament from the medication attachment means into said fluid channel means as determined by the flow of fluid through said fluid channel means from the valve fluid outlet means.

16. Syringe construction as defined in claim 15 in which the valve fluid outlet means includes separate air outlet means and water outlet means; in which the valve air outlet means is operably connected to the first valve means and to the head for receiving air from said first valve means and transmitting said air to said head; in which the head fluid channel means includes a separate air channel means connected to the valve air outlet means and water channel means connected to the valve water outlet means; and in which the venturi tube means is operably connected into one of the head air and water channel means.

References Cited in the file of this patent
UNITED STATES PATENTS

| | | |
|---|---|---|
| 2,083,360 | Brinkman | June 8, 1937 |
| 2,400,912 | Britt et al. | May 28, 1946 |
| 2,757,667 | Bronk | Aug. 7, 1956 |
| 2,959,183 | Jordan | Nov. 8, 1960 |